US007640995B2

United States Patent
Knobloch

(10) Patent No.: US 7,640,995 B2
(45) Date of Patent: Jan. 5, 2010

(54) SEEDBED CONDITIONING VERTICAL TILLAGE APPARATUS

(75) Inventor: Dean A. Knobloch, Goodfield, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/384,652

(22) Filed: Mar. 20, 2006

(65) Prior Publication Data

US 2007/0215366 A1 Sep. 20, 2007

(51) Int. Cl.
*A01B 5/00* (2006.01)
(52) U.S. Cl. ........................ 172/158; 172/604
(58) Field of Classification Search .......... 172/604, 172/584, 21, 158, 160, 579; 111/139, 140
See application file for complete search history.

(56) References Cited

U.S. PATENT DOCUMENTS

| | | | | |
|---|---|---|---|---|
| 369,163 A * | 8/1887 | Clark | | 172/555 |
| 461,133 A | 10/1891 | Smith | | |
| 514,210 A | 2/1894 | Clark | | |
| 570,828 A * | 11/1896 | Tracy | | 241/291 |
| 1,060,280 A | 4/1913 | Olson | | |
| 1,113,241 A | 10/1914 | Niesz | | |
| 1,214,882 A | 2/1917 | Bessan | | |
| 1,539,097 A * | 5/1925 | Peterson | | 172/158 |
| 1,611,358 A * | 12/1926 | Miller | | 172/594 |
| 1,762,844 A | 6/1930 | Towner | | |
| 1,819,950 A * | 8/1931 | Dufour | | 172/116 |
| 1,837,143 A | 12/1931 | Bailey | | |
| 1,837,377 A * | 12/1931 | Stewart | | 172/569 |
| 2,059,205 A * | 11/1936 | Buffington | | 280/43.23 |
| 2,524,871 A * | 10/1950 | Andrus | | 111/200 |
| 2,691,333 A * | 10/1954 | Shumaker | | 172/57 |
| 2,704,970 A | 3/1955 | Greaves | | |
| 2,880,813 A * | 4/1959 | Wiseman | | 172/583 |
| 3,213,514 A | 10/1965 | Evans | | |
| 4,098,349 A | 7/1978 | Jilani | | |
| 4,492,272 A * | 1/1985 | Jensen | | 172/178 |
| 4,598,654 A | 7/1986 | Robertson et al. | | |
| 4,884,640 A * | 12/1989 | van Der Lely et al. | | 172/68 |
| 5,000,720 A | 3/1991 | Phillips | | |
| 5,082,064 A * | 1/1992 | Landoll et al. | | 172/178 |
| 5,158,145 A * | 10/1992 | Karchewski | | 172/548 |
| 5,346,020 A * | 9/1994 | Bassett | | 172/540 |
| 5,462,123 A * | 10/1995 | Harlan et al. | | 172/454 |
| 5,477,792 A | 12/1995 | Bassett et al. | | |
| 5,590,721 A * | 1/1997 | Van Mill | | 172/138 |

(Continued)

OTHER PUBLICATIONS

Yetter Sharktooth, 2 page description, not dated.

(Continued)

*Primary Examiner*—Thomas B Will
*Assistant Examiner*—Mai T Nguyen
(74) *Attorney, Agent, or Firm*—Rebecca Henkel

(57) ABSTRACT

A method and apparatus for soil conditioning, the apparatus comprising a frame, a rotary harrow supported by the frame for engaging the soil and a plurality of disks supported by the frame and in front of the rotary harrow along the advancing direction for rotation about disk axis and for engaging soil below the frame, each disk including a scalloped peripheral edge that forms a plurality of teeth and a space between each two adjacent teeth.

15 Claims, 5 Drawing Sheets

U.S. PATENT DOCUMENTS

| | | | |
|---|---|---|---|
| 5,620,055 A | 4/1997 | Javerlhac | |
| 5,810,093 A * | 9/1998 | Howard | 172/111 |
| 6,279,666 B1 | 8/2001 | Nikkel et al. | |
| 6,554,078 B1 * | 4/2003 | McDonald | 172/69 |
| 6,554,079 B2 | 4/2003 | Bruce | |
| 6,557,646 B1 * | 5/2003 | Hurtis et al. | 172/156 |
| 6,666,280 B1 * | 12/2003 | Wright et al. | 172/178 |
| 6,776,107 B1 | 8/2004 | Shoup | |
| 7,017,675 B2 * | 3/2006 | Ankenman et al. | 172/146 |
| 7,240,627 B1 * | 7/2007 | Whalen et al. | 111/140 |
| 2002/0038620 A1 | 4/2002 | Gentilhomme | |
| 2002/0108764 A1 * | 8/2002 | Bruce | 172/604 |
| 2003/0037935 A1 * | 2/2003 | Sauder | 172/151 |
| 2006/0065412 A1 * | 3/2006 | Bauer | 172/150 |
| 2006/0180324 A1 * | 8/2006 | Hake et al. | 172/158 |

OTHER PUBLICATIONS

Phoenix Til-Lite, Phoenix Rotary Equipment LTD., 2 page description, not dated.

* cited by examiner

SEEDBED CONDITIONING VERTICAL TILLAGE APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention is related to seedbed conditioning tillage tools and more specifically to vertical tillage tools.

To prepare a seed bed for planting, many types of tilling tools have been developed. Currently, the most commonly used tilling tools include cultivators and combination tillage units that include soil engaging components (i.e., disks, tillage tines, etc.) that completely sweep (i.e., smears) an entire tillage floor to turn over and loosen all of the top soil that covers a field. For example, some tillage systems may include two rows of disks arranged such that the disks essentially completely turn over all top soil in a field. To this end, the disks are designed to have characteristics and are juxtaposed with respect to each other and a travel direction such that all of the soil is turned. Typically, to turn all soil via disks, each disk is relatively deeply concave and is inclined at a relatively steep angle with respect to the travel direction. In addition to loosening top soil, these types of tilling tools also have an advantageous leveling effect on soil as they are pulled through a field. Here, level soil is important to minimize bounce of planter assemblies that are subsequently used in a field so that seed depth can be relatively accurately controlled. Unfortunately, while these types of tilling tools loosen or till top soil well, these types of tools tend to compact under soil (i.e., soil below the top soil) as portions of the soil engaging components smear across the under soil during travel. More specifically, when a deep dish disk is inclined relatively steeply to a travel direction, the backside of the disk tends to smear and compress soil therebelow. When under soil is smeared, the density of the under soil increases and root growth is inhibited.

To reduce the smearing effect, rotary spike harrows have been developed that, as the label implies, include rotary spike toothed members that are mounted to a harrow axle and that generally rotate about a horizontal harrow axis substantially normal to or on a slight incline (e.g., 15°-35°) with respect to a travel direction. Here, the spikes of each toothed member penetrate soil by being driven substantially vertically downward and disrupt the soil as the spike angle within the soil changes during member rotation. The end result is tillage with less smearing effect (slight smearing still results in some applications).

While rotary spike harrows reduce smearing/soil compaction, unfortunately these types of tilling tools have several shortcomings. First, rotary spike toothed harrows usually include a relatively large number of toothed members arranged on an axle so that the weight of the tilling implement is distributed over a large number of member teeth and the spikes do not, under typical soil conditions, penetrate the soil being tilled to a desired level during a single pass. Second, rotary spike toothed harrows do not level soil to the same extent as other types of tilling tools during a single pass through a field. Here, the shortcomings of the spike toothed harrows can be overcome by increasing the number of passes through a field (e.g., 3 passes instead of a single pass). Obviously additional passes require additional time and thus are not desirable.

Thus, it would be advantageous to have a tilling tool or assembly that could adequately till a field in a single pass while minimizing smearing and soil compaction.

BRIEF SUMMARY OF THE INVENTION

At least some embodiments include an apparatus for soil conditioning for transport through a field in an advancing direction, the apparatus comprising a frame, a rotary harrow supported by the frame for engaging the soil and a plurality of disks supported by the frame and in front of the rotary harrow along the advancing direction for rotation about disk axis and for engaging soil below the frame, each disk including a scalloped peripheral edge that forms a plurality of teeth and a space between each two adjacent teeth.

In some cases each tooth includes a leading concave cutting edge and a following convex edge wherein, as each disk rotates, the leading concave edge of each tooth enters the soil prior to an associated following convex edge. In some embodiments each tooth further includes a lateral edge between the leading and following edges. In some cases the spaces divide each pair of adjacent lateral edges and wherein each space has a gap dimension that is approximately twice the size of the lateral edge length. In some cases each disk includes between fourteen and twenty teeth.

In some cases each of the disks includes first and second oppositely facing sides and each disk is convex to the first side and concave to the second side. In some embodiments the disk axis are similarly angled with respect to the advancing direction, a frame axis is perpendicular to the advancing direction and the disk axis form a disk angle of between five and twenty degrees with respect to the frame axis with the second sides of the disks opening in the advancing direction. In some cases each of the blade angles is between seven and ten degrees with respect to the frame axis.

In some cases the rotary harrow includes spike toothed members mounted for rotation about a harrow axis and wherein the harrow axis is angled at a harrow angle with respect to the frame axis. In some cases the disks are arranges to form grooves in the soil that extend along the advancing direction and the rotary spike harrow is arranged to form diagonal grooves that are angles with respect to the advancing direction and wherein the grooves formed by the harrow form a 15° to 45°angle with the grooves formed by the disk blades.

In some cases each disk is concave, has a diameter between 16 and 24 inches, has a depth of between one-half and one and one-half inches and has a radius of curvature of between 600 and 1000 millimeters. In some cases each disk has a diameter of approximately 20 inches, a depth of approximately one-half to one inch and a radius of curvature of approximately 920 millimeters. In some cases each tooth is a radially extending tooth.

The invention also includes an apparatus for soil conditioning for transport through a field in an advancing direction, the apparatus comprising a frame, a rotary harrow supported by the frame for engaging the soil and a plurality of disks supported by the frame and in front of the rotary harrow along the direction of travel for rotation about disk axis and for engaging soil below the frame, each disk including a scalloped peripheral edge that forms a plurality of teeth and a space between each two adjacent teeth, each tooth including a leading concave cutting edge, a following convex edge and a lateral edge between the leading and following edges, wherein, as each disk rotates, the leading concave edge of each tooth enters the soil prior to an associated following convex edge, spaces dividing each pair of adjacent lateral edges, each space having a gap dimension that is approximately twice the size of the lateral edge length, each disk including first and second oppositely facing sides and each disk is convex to the first side and concave to the second side, each disk having a diameter between 16 and 24 inches, a depth of between one-half and one and one-half inches and having a radius of curvature of between 600 and 1000 millimeters.

In some cases the disk axis are similarly angled with respect to the advancing direction, a frame axis is perpendicular to the advancing direction and the disk axis form a disk angle of between seven and ten degrees with respect to the frame axis with the second sides of the disks opening in the advancing direction. In some embodiments the disks are arranges to form grooves in the soil that extend along the advancing direction and the harrow is arranged to form diagonal grooves that are angles with respect to the advancing direction and wherein the grooves formed by the harrow form at least a 15° to 45° angle with the grooves formed by the disk blades.

Some embodiments include a method for soil conditioning, the method comprising the steps of mounting a rotary harrow below a frame for engaging soil below the frame, providing a plurality of disks, each disk including a scalloped peripheral edge that forms a plurality of teeth and a space between each two adjacent teeth, mounting the disks to the frame in front of the rotary harrow along an advancing direction for rotation about disk axis and for engaging soil below the frame and moving the frame, disks and harrow in the advancing direction through a field with the harrow and disks engaging soil there below.

In some embodiments the step of providing disks includes providing a plurality of disks wherein each tooth includes a leading concave cutting edge and a following convex edge wherein, as each disk rotates, the leading concave edge of each tooth enters the soil prior to an associated following convex edge.

Some embodiments include an apparatus for soil conditioning for transport through a field in an advancing direction, the apparatus comprising a frame having a frame axis that is perpendicular to the advancing direction and a plurality of dished concave disks supported by the frame and in front of the rotary harrow along the advancing direction for rotation about disk axis that are angled between 7 and 10 degrees with respect to the frame axis and for engaging soil below the frame, each disk including a scalloped peripheral edge that forms a plurality of teeth, each disk having a diameter between 16 and 24 inches, a depth of between one-half and one and one-half inches and a radius of curvature of between 600 and 1000 millimeters.

DETAILED DESCRIPTION OF THE INVENTION

Figure 1:
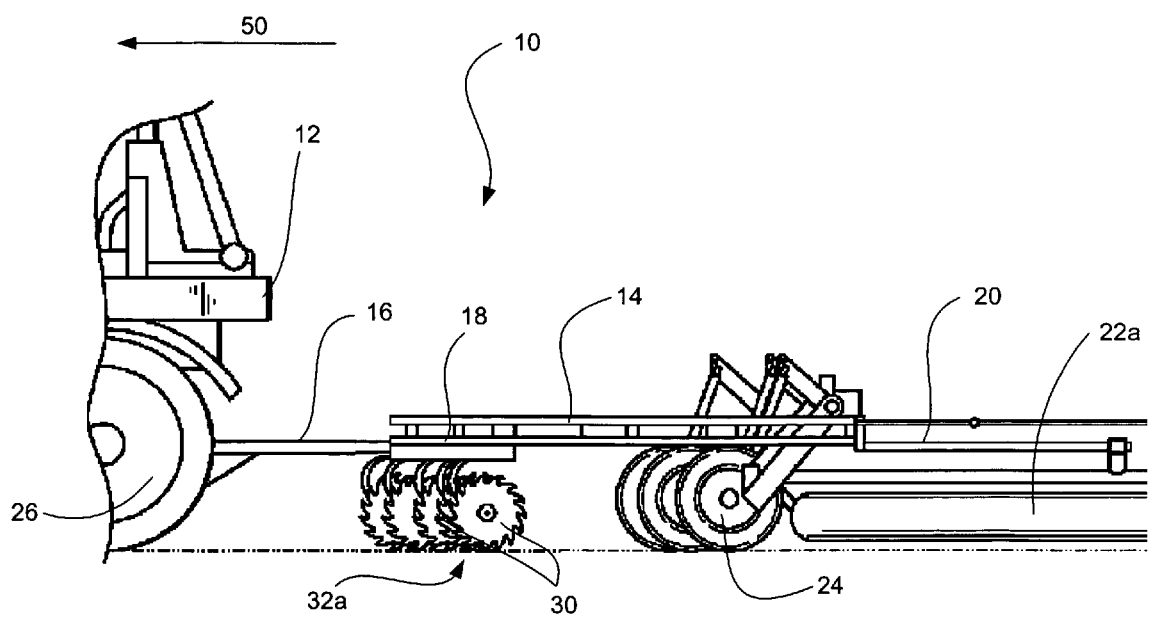
FIG. 1 is a side perspective view of a tillage assembly according to at least one embodiment of the present invention.

Referring now to the drawings wherein like reference numerals correspond to similar elements throughout the several view and, more specifically, referring to FIG. 1, the present invention will be described in the context of an exemplary work vehicle 12 having a vehicle support structure to which a plurality of wheels 26 are rotatably mounted. A work vehicle 12 typically has a power source coupled to a transmission with the transmission operatively coupled to at least two of the wheels 26. The power source can be an internal combustion engine such as a gasoline engine or a diesel engine and it may also be an electric motor or a steam driven turbine.

Figure 2:
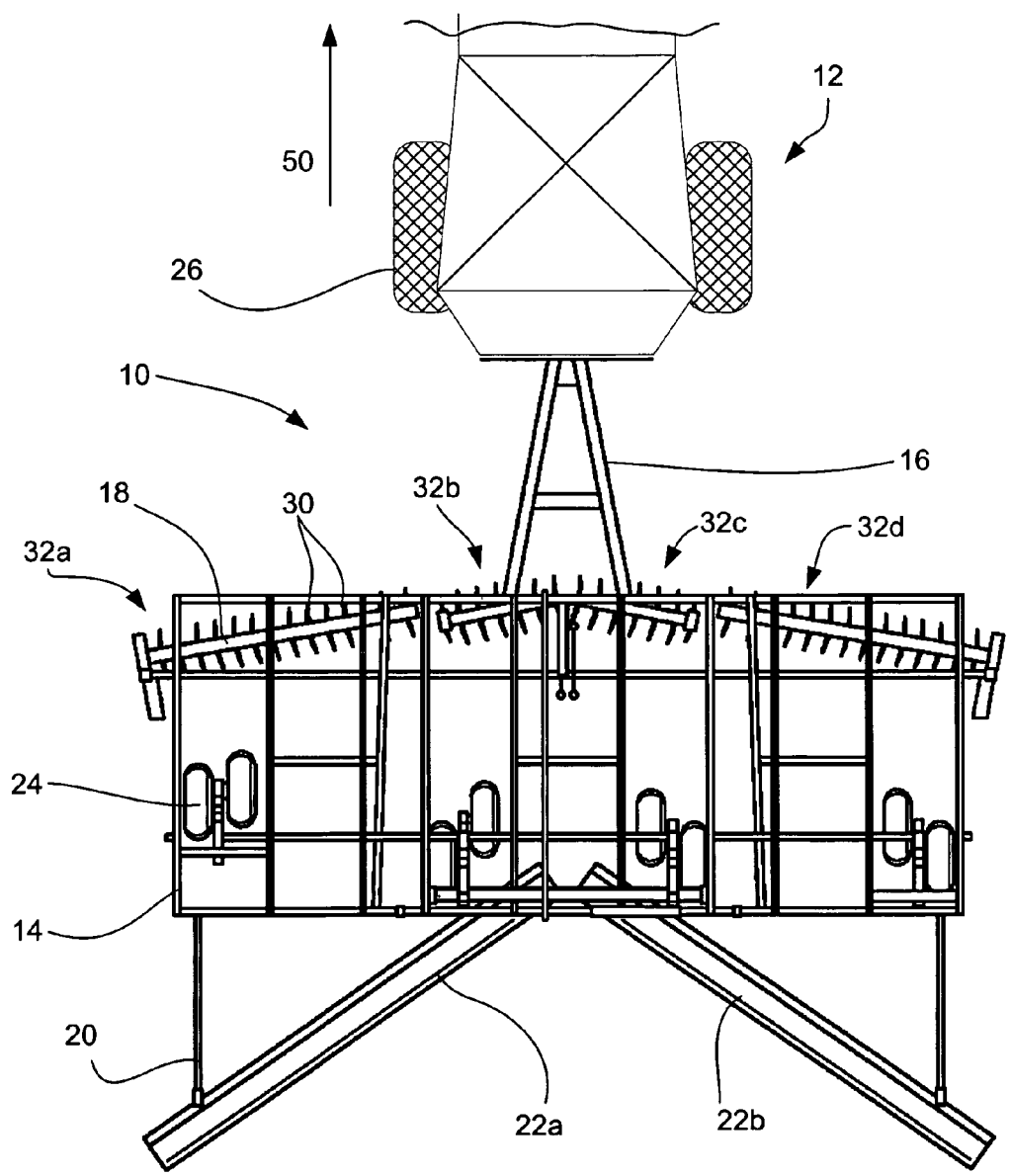
FIG. 2 is a top plan view of the tillage assembly of FIG. 1.

Referring still to FIG. 1 and also to FIG. 2, a tillage assembly 10 is illustrated which is linked to tractor 12 by a tow bar 16. In addition to tow bar 16, tillage assembly 10 includes a main frame 14, wheels, one subassembly of wheels identified by numeral 24, first through forth disk subassemblies 32a, 32b, 32c and 32d and first and second rotary spiked tooth harrows 22a and 22b, respectively. Frame 14 includes a plurality of rigid steel members that are welded or otherwise mechanically secured together to form a rectilinear frame assembly as best seen in FIG. 2. A frame axis 15 that is perpendicular to a travel direction 50 is shown twice in FIG. 5. While frame axis 15 are parallel to frame members in the FIG. 5 embodiment, axis 15 need not be parallel to any frame members in other embodiments where frame members are not perpendicular to the travel direction 50. Tow bar 16 extends forward from frame 14 to mount assembly 14 to tractor 12 as illustrated. Wheels 24 are mounted to and extend down from main frame 14 to support frame 14 above soil in a field through which tillage assembly 10 is pulled by tractor 12.

Referring still to FIGS. 1 and 2 and also to FIG. 5, for the purposes of the present invention, each of the disk subassemblies 32a, 32b, 32c and 32d have similar constructions and operate in a similar fashion and therefore, in the interest of simplifying this explanation, only subassembly 32a will be described in any detail. Subassembly 32a includes, among other components, an implement mounting bar 18, a plurality of disks, two of which are collectively identified by numeral 30 in each of FIGS. 2 and 5, and some type of adjusting mechanism (e.g., a hydraulic cylinder 60, turn buckle, etc.).

Figure 3:
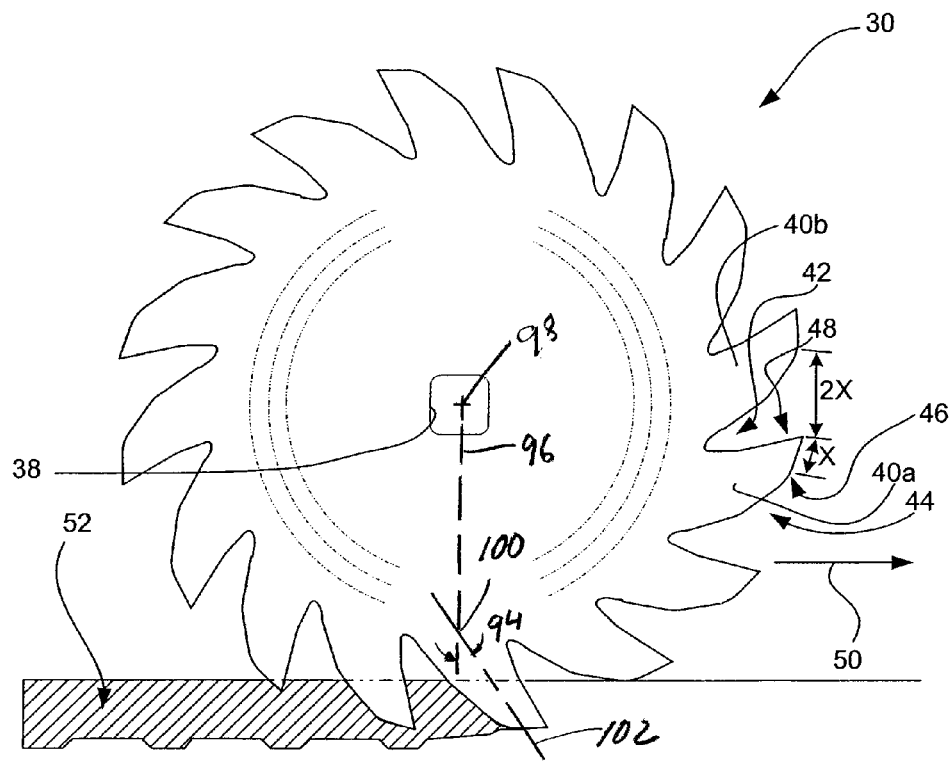
FIG. 3 is a side view of one of the disks of the tillage assembly of FIG. 1.
Figure 4:
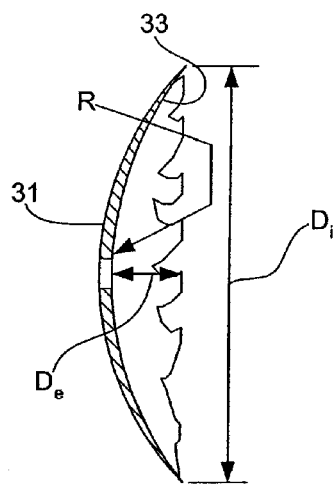
FIG. 4 is a cross-sectional view of the disk of FIG. 3.

In at least one embodiment, as illustrated best in FIGS. 3 and 4, each of the disk members 30 include a concave disk that forms outwardly extending teeth 40a, 40b, etc., on its circumferential edge. Each of the teeth 40a and 40b are identical and therefore, in the interest of simplifying this explanation, only tooth 40a will be described here in detail. As shown, tooth 40a is a saw blade type tooth and, to that end, includes a concave leading edge 44, a convex following edge 48 and a lateral edge 46 that extends from the leading edge 44 to the following edge 48, the lateral edge 46 and following edge 48 forming a tooth point (not labeled). Each two adjacent teeth 40a, 40b, etc., are separated by a gap or space (e.g., 42). Each disk 30 forms one or more generally centrally located mounting openings 38. Referring specifically to FIG. 4, each disk 30 has first and second oppositely facing surfaces 31 and 33, respectively. Surface 31 is convex while surface 33 is concave where each of the surfaces 31 and 33 has a similar radius of curvature R. Exemplary disk 30 has a diameter dimension $D_i$ and a depth dimension $D_e$ as illustrated.

As mentioned above, each tooth (40a, 40b, etc.) includes a concave leading edge 44, a convex following edge 48 and a lateral edge 46 that extends from the leading edge 44 to the following edge 48. As shown particularly in FIG. 3, each of the teeth further include a rearward pitch, or slant, 94 angled toward the following convex edge 48. Rearward pitch 94 is the slant of the tooth as measured by the angle between 1) a radial extension 96 through disk center point 98 and the center 100 of the base of a corresponding tooth, and 2) the centerline 102 of the tooth.

Figure 5:
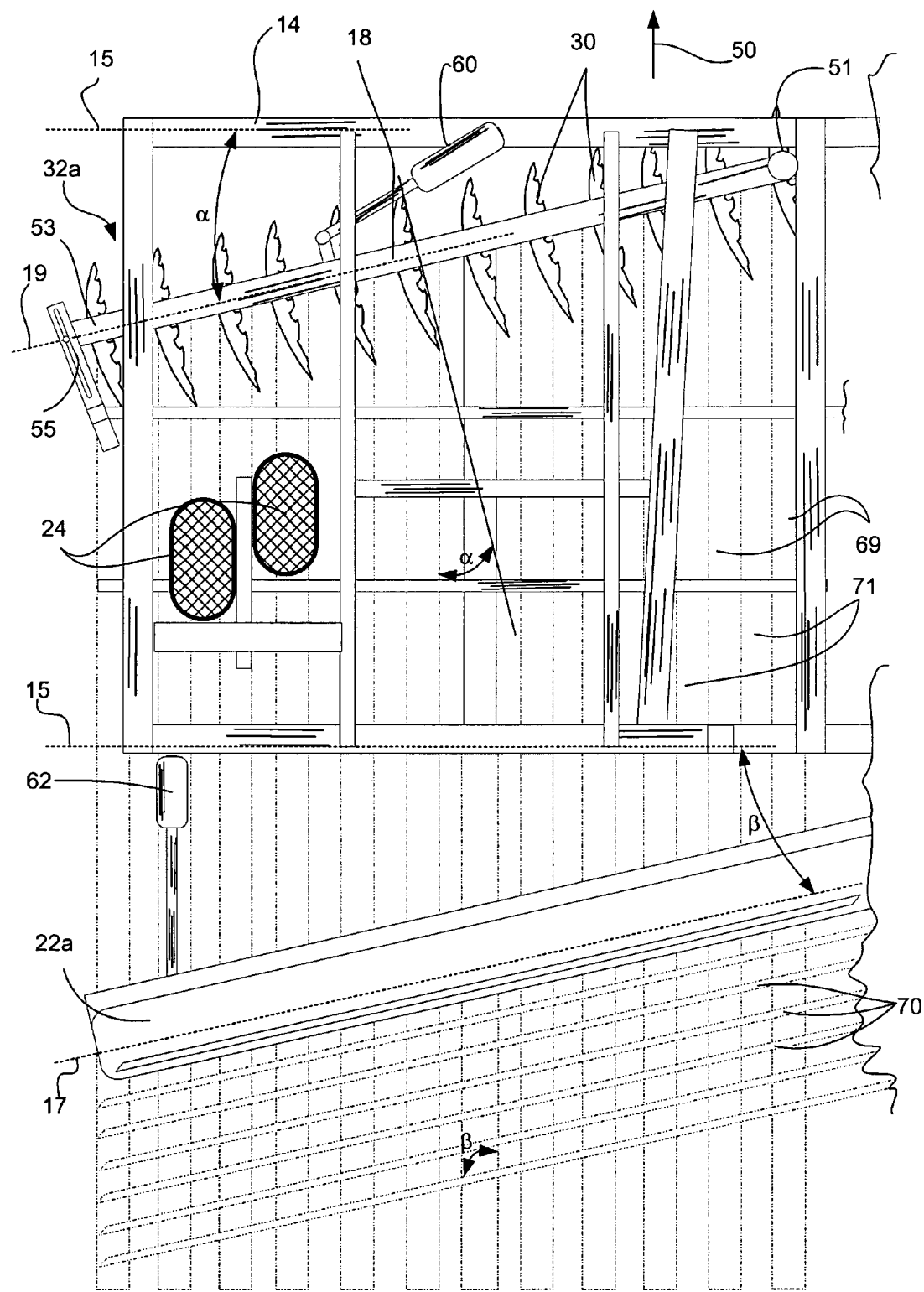
FIG. 5 is an enlarged top plan view of a portion of the tillage assembly of FIG. 1.

Referring to FIGS. 3, 4 and 5, disks 30 are mounted to implement mounting bar 18 such that the disks are aligned for rotation about a common disk axis 19 that is generally parallel to the length of bar 18. Thus, each disk is mounted so as to be generally perpendicular to bar 18.

Referring to FIGS. 1 and 5, bar 18 mounts below frame 14 such that disks 30 extend downward below main frame assembly 14 and engage soil therebelow. In this regard, a first end 51 of bar 18 is pivotally mounted to frame 14 and a second end 53 of bar 18 is journalled in a slot forming member 55 to slide therealong as bar 18 pivots about first end 51. Adjusting mechanism 60 includes a first end mounted to frame 14 and a second end mounted to a central portion of bar 18.

When bar 18 is mounted to frame 14, bar 18 is juxtaposed so that bar 18 and disk axis 19 form an angle α with respect to frame axis 15. When bar 18 is angled, disks 30 are inclined at a similar angle α with respect to travel direction 50. When so inclined, the second surfaces 33 (see again FIG. 4) of disks 30 generally open in the direction of travel 50. To adjust angle α between bar 18 and frame axis 15, cylinder 60 is manipulated. When cylinder 60 is extended, angle α is increased and, when cylinder 60 is retracted, angle α is decreased.

Referring again to FIG. 5, as assembly 10 is moved through a field, disks 30 engage soil therebelow and form grooves, two of which are collectively identified by numeral 69. As described in greater detail below, disks 30 are selected such that their dimensions and characteristics and their spacing along bar 18 result in grooves 52 that are separated by loosened/disturbed soil bands (e.g., 71) therebetween.

Referring again to FIGS. 2 and 5, in most applications, disk subassemblies 32a and 32b will be mounted to frame assembly 14 such that the component mounting bar members (e.g., 18) form similar angles a with respect to the frame axis 15. Similarly, each of disk subassemblies 32c and 32d are mounted to frame assembly 14 so as to form angles a, albeit where the angles formed by subassemblies 32c and 32d with respect to frame axis 15 are in the opposite direction (e.g., where angle α of subassembly 32a is −7°, angle α of subassembly 32c and 32d will be approximately +7°).

Figure 7:
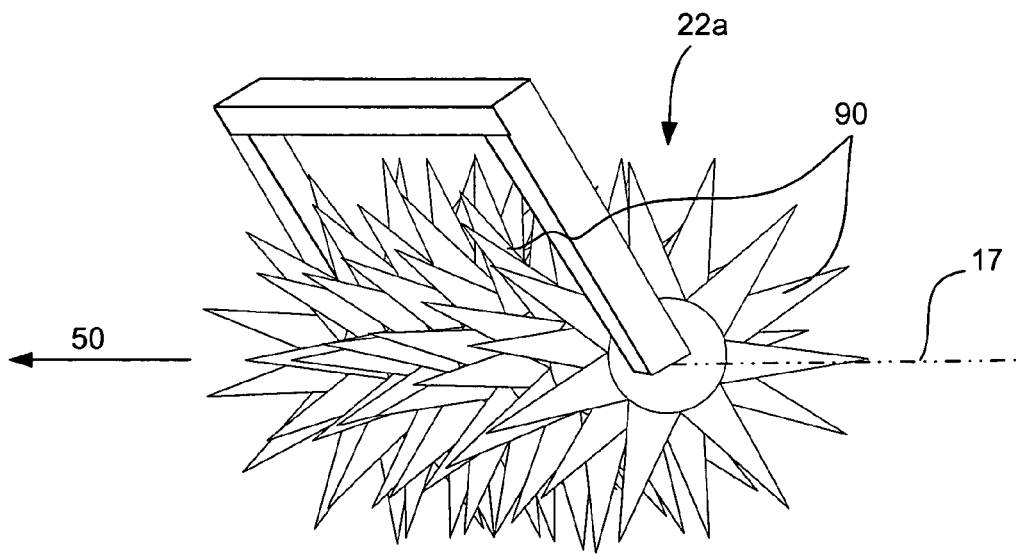
FIG. 7 is a side perspective view of an exemplary spike toothed harrow that may be employed in some inventive embodiments.

Referring to FIG. 2, harrows 22a and 22b are similar and operate in a similar fashion and therefore, in the interest of simplifying this explanation, only harrow 22a will be described here in detail. Referring also to FIGS. 1 and 5, harrow 22a is a rotary spike toothed harrow that is mounted below frame assembly 14 and behind disk subassemblies 30 along the travel or advancing direction 50. Referring to FIG. 7, an exemplary perspective view of harrow 22a is shown where it can be seen that harrow 22a includes multiple spike toothed members 90 arranged to rotate along a common harrow axis 17. Harrow 22a has a length dimension along axis 17. Harrow 22a can be adjusted with respect to frame axis 15 such that an angle β between harrow axis 17 and frame axis 15 can be modified. To this end, a second adjusting mechanism 62 (e.g., hydraulic cylinder, turn buckle, etc.) is provided between frame assembly 14 and harrow 22a. Construction and operation of spike toothed rotary harrows is well known in the art and therefore are not described here in detail. Here, it should suffice to say that in operation, as harrow 22a is pulled through a field, the spike toothed members 90 engage soil therebelow and form generally lateral grooves, three of which are collectively identified by numerals 70 in FIG. 5. Here, the lateral grooves 70 form angles β with respect to the travel direction 50 that are similar to the angle β formed between harrow axis 17 and main frame axis 15.

Referring to FIGS. 1 through 5, in at least some embodiments, disks 30 are selected to have specific characteristics and are mounted so as to engage soil therebelow in a vary specific manner that minimizes the smearing effect caused by other types of disks. To this end, in a particularly advantageous embodiment, it has been found that smearing can be reduced by selecting disks 30 that have relatively minimal depth $D_e$ dimensions and that are scalloped or toothed in some fashion and by mounting the disks to rotate about a disk axis (e.g., 19) that is only slightly angled from the frame axis 15. Here, the idea is to use the disks to initially disturb the soil to a point where a single spike toothed harrow pass will cause adequate tillage to occur while minimizing soil smearing. In effect, the disks work the soil to a generally optimal point for the harrows to work ideally while causing minimal smearing. In this regard, referring to FIG. 5, because the disks 30 have a narrow depth $D_e$ and angle α is minimal (e.g., 7-10°), as the disks 30 rotate, the disks form grooves 69 with loosened bands 71 of soil therebetween. In addition, because the disks have narrow depths and are minimally inclined with respect to travel direction 50, the disks cause reduced backside disk blade pressure which has several advantages. First, reduced or substantially eliminated backside pressure means that smearing and compaction of the soil is minimized or substantially eliminated. Second, reduced backside pressure means that the forces working against disk penetration are minimized and therefore the weight of frame 14 can be advantageously reduced as a light frame 14 can cause sufficient penetration.

In at least one advantageous embodiment, disks 30 are selected that have diameters $D_i$ that are approximately 20 inches, that have depths $D_e$ that are approximately one-half to one and one-half inch and that have radiuses of curvature R of approximately 920 mm and the disks are mounted below frame 14 such that the inclined angle α of the disks with respect to the travel direction 50 is between 7 and 10 degrees.

Referring again to FIG. 3, in a particularly advantageous embodiment, saw tooth type disks 30 are employed where the dimension of the portion of each gap 42 between lateral edges (e.g., see 46 in FIG. 3) of adjacent teeth 40a and 40b is approximately twice the dimension of each of the lateral edges 46. Thus, for example, where the dimension of the portion of gap 42 between adjacent lateral edges is 2.6 inches, each of the adjacent lateral edges would have a length of approximately 1.3 inches. In the illustrated embodiment disk 30 has 16 teeth. In other cases the number of teeth may vary. Here, the idea behind toothed disks is to relocate soil while minimizing the actual engagement of the disk with the soil. In the present example, 66% of the soil engaging portion of the disk is removed yet the rippled or scalloped grooves 69 (i.e., continuous grooves with depth variations therealong) in the soil are essentially continuous because soil that is engaged pushes against adjacent soil and causes the adjacent soil to breakout and loosen.

Referring again to FIG. 3, in advantageous embodiments disks 30 are juxtaposed with respect to travel direction 50 such that, as the disks engage field soil and rotate, leading tooth edges 44 are driven toward the soil followed by associated following edges 48 on common teeth (e.g., 40*a*). Here, edges 46 tend to cut through field debris well and penetrate the soil effectively while only causing minimal soil compaction when compared to non-scalloped or non-toothed type disks or saw tooth type disks where the concave edges lead the convex edges.

After the disks 30 loosen the soil and form grooves 69, rotary harrows 22*a*, 22*b*, operate at angles (e.g., 45° or more with respect to travel direction 50) to dislodge undisturbed or loosened soil between the grooves 69, to level loose soil and evenly distribute residue in the soil.

While the dimensions and disk axis angle range described above are believed to be particularly advantageous, it is believed that other similar dimensions and similar axis angles will cause similar effects. For instance, it is believed that the blade depth $D_e$ may, in some cases, may be in the one-half to one and one-half inch range, the diameter $D_i$ may be between 16 and 24 inches and the radius of curvature R may be between 600 and 1000 millimeters. The angle $\alpha$ may be between 5° and 20° depending upon disk depth and diameter dimensions. Here, the important aspect is that the combination of disk characteristics (e.g., depth, diameter, radius of curvature) and disk juxtaposition (e.g., incident angle $\alpha$ with respect to the travel direction) be selected to reduce or minimize smearing of soil below the assembly 10. In the present case, while the disk assemblies (e.g., 32*a*) form grooves and only loosen much of the top soil, the resulting soil is suitable for a single pass of a harrow to result in effective tillage for most applications.

Figure 6:
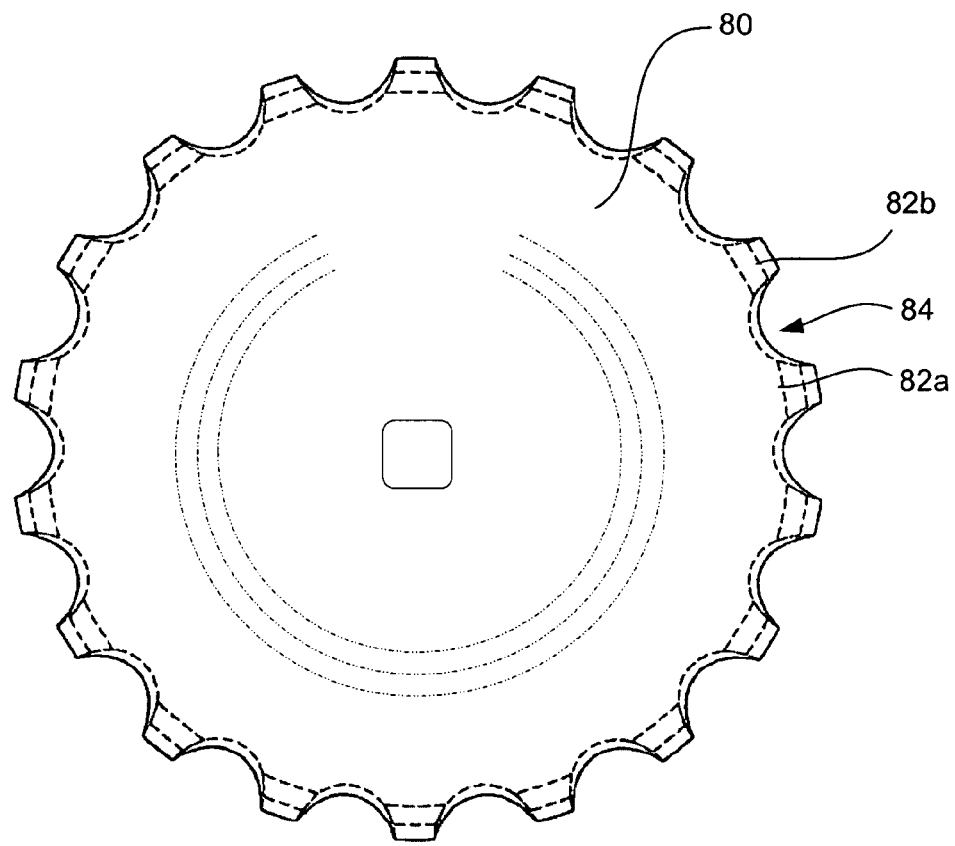
FIG. 6 is a view similar to the view of FIG. 3, albeit illustrating a second type of disk that may be used instead of the saw tooth disk in a tillage assembly like the one illustrated in FIG. 3.

While the invention may be susceptible to various modifications and alternative forms, specific embodiments have been shown by way of example in the drawings and have been described in detail herein. However, it should be understood that the invention is not intended to be limited to the particular forms disclosed. For example, referring to FIG. 6, a notched disk 80 is illustrated that could be substituted for the saw tooth disks of FIG. 3 to achieve a similar result. Disk 80 includes 18 radially extending teeth 82*a*, 82*b*, etc., that are separated by semi-circular recesses or gaps 84. Here, disk 80 is concave and would be arranged in a fashion similar to that illustrated in FIG. 5 with the concave side opening in the travel direction 50. Once again the depth $D_e$ of disk 80 would be minimized and the inclination angle $\alpha$ would be minimal to reduce backside pressure and hence to reduce soil smearing.

Thus, the invention is to cover all modifications, equivalents, and alternatives falling within the spirit and scope of the invention as defined by the following appended claims. To apprise the public of the scope of this invention, the following claims are made:

What is claimed is:

1. An apparatus for soil conditioning for transport through a field in an advancing direction, the apparatus comprising:
    a frame defining a frame axis perpendicular to the advancing direction;
    a plurality of rotary spiked toothed harrow having opposing ends; said one end of said rotary spiked harrow mounted to a support member attached to an outer end of said frame; said second end of said rotary spiked harrow mounted to generally center of a rearward portion of said frame;
    said plurality of rotary spiked toothed harrow includes a multiple of spiked tooth members;
    an adjustment mechanism is provided between said outer end of said frame and to said support member;
    said plurality rotary spiked toothed harrow supported by the frame for engaging the soil and extending along a harrow axis, the harrow axis being angled at a user adjustable acute, harrow angle with respect to the frame axis;
    said plurality of rotary spiked toothed harrow adjusts with respect to said frame axis and to said harrow axis by said adjusting mechanism; and
    a plurality of disks supported by the frame and in front of the plurality of rotary spiked tooth harrow along the advancing direction for rotation about a disk axis and for engaging soil below the frame, each disk including a scalloped peripheral edge that forms a plurality of teeth and a space between each two adjacent teeth, each tooth including a leading concave cutting edge and a following convex edge wherein, as each disk rotates, the leading concave edge of each tooth enters the soil prior to an associated following convex edge, each tooth further including a forward pitch angled toward the leading concave edge;
    wherein:
    the disk axis being angled at a user adjustable acute, disk angle with respect to the frame axis; and
    the disks are arranged to form ripple grooves in the soil that extend along the advancing direction and the rotary harrow is arranged to form diagonal grooves that are angles with respect to the advancing direction and wherein the grooves formed by the harrow form an 18° to 45° angle with the grooves formed by the disk blades.

2. The apparatus of claim 1 wherein each tooth further includes a lateral edge extending from a corresponding following edge to a corresponding leading edge.

3. The apparatus of claim 2 wherein spaces divide each pair of adjacent lateral edges and wherein each space has a gap dimension that is approximately twice the size of the lateral edge length.

4. The apparatus of claim 3 wherein the gap dimension is approximately 2.6 inches.

5. The apparatus of claim 1 wherein each disk includes between fourteen and twenty teeth.

6. The apparatus of claim 5 wherein each disk includes sixteen teeth.

7. The apparatus of claim 1 wherein each of the disks includes first and second oppositely facing sides and each disk is convex to the first side and concave to the second side.

8. The apparatus of claim 7 wherein the disk axis forms the disk angle of between five and twenty degrees with respect to the frame axis with the second sides of the disks opening in the advancing direction.

9. The apparatus of claim 8 wherein each of the disk angles is between seven and ten degrees with respect to the frame axis.

10. The apparatus of claim 8 wherein the rotary harrow includes spike toothed members mounted for rotation about the harrow axis.

11. The apparatus of claim 1 wherein the disk is concave, has a diameter between 16 and 24 inches, has a depth of between one-half and one and one-half inches and has a radius of curvature of between 600 and 1000 millimeters.

12. The apparatus of claim 1 wherein each disk has a diameter of approximately 20 inches, a depth of approximately ½ inch and a radius of curvature of approximately 920 millimeters.

13. An apparatus for soil conditioning for transport through a field in an advancing direction, the apparatus comprising:
    a frame defining a frame axis perpendicular to the advancing direction;

a plurality of rotary spiked toothed harrow having opposing ends; said one end of said rotary spiked harrow mounted to a support member attached to an outer end of said frame; said second end of said rotary spiked harrow mounted to generally center of a rearward portion of said frame;

said plurality of rotary spiked toothed harrow includes a multiple of spiked tooth members;

an adjustment mechanism is provided between said outer end of said frame and to said support member;

said plurality rotary spiked toothed harrow supported by the frame for engaging the soil and extending along a harrow axis, the harrow axis being angled at a user adjustable acute, harrow angle with respect to the frame axis;

said plurality of rotary spiked toothed harrow adjusts with respect to said frame axis and to said harrow axis by said adjusting mechanism; and a plurality of disks supported by a the frame and in front of the plurality rotary spiked toothed harrow along the direction of travel for rotation about a disk axis and for engaging soil below the frame, each disk including a scalloped peripheral edge that forms a plurality of teeth and a space between each two adjacent teeth, each tooth including a leading concave cutting edge, a following convex edge and a lateral edge extending from a corresponding following edge to a corresponding leading edge, wherein, as each disk rotates, the leading concave edge of each tooth enters the soil prior to an associated following convex edge, spaces dividing each pair of adjacent lateral edges, each space having a gap dimension that is approximately twice the size of the lateral edge length, each disk including first and second oppositely facing sides and each disk is convex to the first side and concave to the second side, each disk having a diameter between 16 and 24 inches, a depth of between one-half and one and one-half inches and having a radius of curvature of between 600 and 1000 millimeters, each tooth further including a forward pitch angled toward the leading concave edge;

wherein:

the disc axis being angled at a user adjustable acute, disc angle with respect to the frame axis; and the disks are arranged to form rippled grooves in the soil that extend along the advancing direction and the harrow is arranged to form diagonal grooves that are angled with respect to the advancing direction and wherein the grooves formed by the harrow form at least a 18° to 45° angle with the grooves formed by the disk blades.

14. The apparatus of claim 13 wherein the disk axis forms a disk angle of between seven and ten degrees with respect to the frame axis with the second sides of the disks opening in the advancing direction.

15. The apparatus of claim 13 wherein each disk has a diameter of approximately 20 inches, a depth of approximately one-half and one and one-half inches and a radius of curvature of approximately 920 millimeters.

\* \* \* \* \*